(12) United States Patent
Takahashi

(10) Patent No.: US 10,999,489 B2
(45) Date of Patent: May 4, 2021

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Hayato Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 16/516,421

(22) Filed: Jul. 19, 2019

(65) Prior Publication Data
US 2020/0029011 A1  Jan. 23, 2020

(30) Foreign Application Priority Data

Jul. 23, 2018  (JP) .............................. JP2018-138011

(51) Int. Cl.
*G02B 7/36* (2021.01)
*G03B 13/36* (2021.01)
*H04N 5/232* (2006.01)

(52) U.S. Cl.
CPC ........... *H04N 5/23212* (2013.01); *G02B 7/36* (2013.01); *G03B 13/36* (2013.01)

(58) Field of Classification Search
USPC ......................................................... 396/128
See application file for complete search history.

(56) References Cited

U.S. PATENT DOCUMENTS

| 8,005,271 | B2 * | 8/2011 | Kawada | G06K 9/6857 |
| | | | | 382/118 |
| 8,639,105 | B2 * | 1/2014 | Ogino | H04N 5/23212 |
| | | | | 396/124 |
| 2009/0021637 | A1 * | 1/2009 | Tanaka | H04N 7/012 |
| | | | | 348/452 |
| 2009/0067828 | A1 * | 3/2009 | Ono | H04N 5/23212 |
| | | | | 396/128 |

FOREIGN PATENT DOCUMENTS

JP   2003-262788 A   9/2003

* cited by examiner

*Primary Examiner* — Clayton E. LaBalle
*Assistant Examiner* — Warren K Fenwick
(74) *Attorney, Agent, or Firm* — Cowan, Liebowitz & Latman, P.C.

(57) ABSTRACT

An image processing apparatus generates a predetermined evaluation value from a current frame image of a moving image or a combined image by combining a plurality of frame images of the moving image. The image processing apparatus generates the evaluation value from the combined image if a previous evaluation value is smaller than a threshold, and from the current frame image if the previous evaluation value is larger than or equal to the threshold.

16 Claims, 6 Drawing Sheets

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus.

Description of the Related Art

In recent years, due to performance improvement of image sensors, their readout frame rate has been increasing. In addition, an increase in the readout frame rate contributes to performance improvement of processing in which information acquired from a captured image is used, such as AF processing and subject tracking processing. In Japanese Patent Laid-Open No. 2003-262788, an increase in the speed of AF processing is realized by increasing the frame rate when the subject luminance is high.

Due to an increase in the readout frame rate, an object that was blurred at a conventional frame rate appears clear if the shutter speed when shooting each frame is also increased. In addition, there are cases where, as a result of the object appearing motionless, information that is acquired from an image changes from information when the object appeared blurred. For example, when a main subject such as a person is shot in a scene with small moving objects such as raindrops or water droplets of a fountain, information acquired from the region of the main subject may be different between a case where the water droplets are blurred and appear as droplet trajectories and a case where the water droplets are motionless and appear as water droplets.

SUMMARY OF THE INVENTION

The present invention provides an image processing apparatus, an image processing method, and an image capture apparatus that can lower the influence that blur of a moving object in an image has on information acquired from the image, the influence depending on the degree of the blur.

According to an aspect of the present invention, there is provided an image processing apparatus comprising: one or more processors that execute a program and, when executing the program, operate as: a combining unit configured to generate a combined image by combining a plurality of frame images of a moving image that include a current frame image; a selecting unit configured to selectively output the current frame image or the combined image; and a generating unit configured to generate a predetermined evaluation value from the image that is output by the selecting unit, wherein the generating unit controls the selecting unit to output the combined image if the generated evaluation value is smaller than a threshold, and output the current frame image if the evaluation value is larger than or equal to the threshold.

According to another aspect of the present invention, there is provided an image capture apparatus comprising: an image sensor for shooting a moving image; and an image processing apparatus that processes a moving image shot using the image sensor, wherein the image processing apparatus comprises: one or more processors that execute a program and, when executing the program, operate as: a combining unit configured to generate a combined image by combining a plurality of frame images of a moving image that include a current frame image; a selecting unit configured to selectively output the current frame image or the combined image; and a generating unit configured to generate a predetermined evaluation value from the image that is output by the selecting unit, wherein the generating unit controls the selecting unit to output the combined image if the generated evaluation value is smaller than a threshold, and output the current frame image if the evaluation value is larger than or equal to the threshold.

According to a further aspect of the present invention, there is provided an image processing method that is executed by an image processing apparatus, comprising: generating a combined image by combining a plurality of frame images of a moving image that include a current frame image; outputting the current frame image or the combined image selectively; and generating a predetermined evaluation value from the image that is outputted by the outputting, wherein, in the outputting, the combined image is output if the evaluation value is smaller than a threshold, and the image of the current frame is output if the evaluation value is larger than or equal to the threshold.

According to another aspect of the present invention, there is provided a non-transitory computer-readable medium that stores a program for causing a computer to function as an image processing apparatus comprising: a combining unit configured to generate a combined image by combining a plurality of frame images of a moving image that include a current frame image; a selecting unit configured to selectively output the current frame image or the combined image; and a generating unit configured to generate a predetermined evaluation value from the image that is output by the selecting unit, wherein the generating unit controls the selecting unit to output the combined image if the generated evaluation value is smaller than a threshold, and output the current frame image if the evaluation value is larger than or equal to the threshold.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that embodiments to be described are only exemplary, and do not limit the scope of the present invention. For example, embodiments in which the present invention is applied to an image capture apparatus will be described below. However, the present invention can be carried out in any electronic apparatus that can acquire information from moving image data. Examples of such an electronic apparatus include personal computers, tablet terminals, mobile phones, gaming devices, drive recorders, robots, and drones, as well as image capture apparatuses such as digital cameras and digital video cameras, but there is no limitation thereto.

First Embodiment

Figure 1:
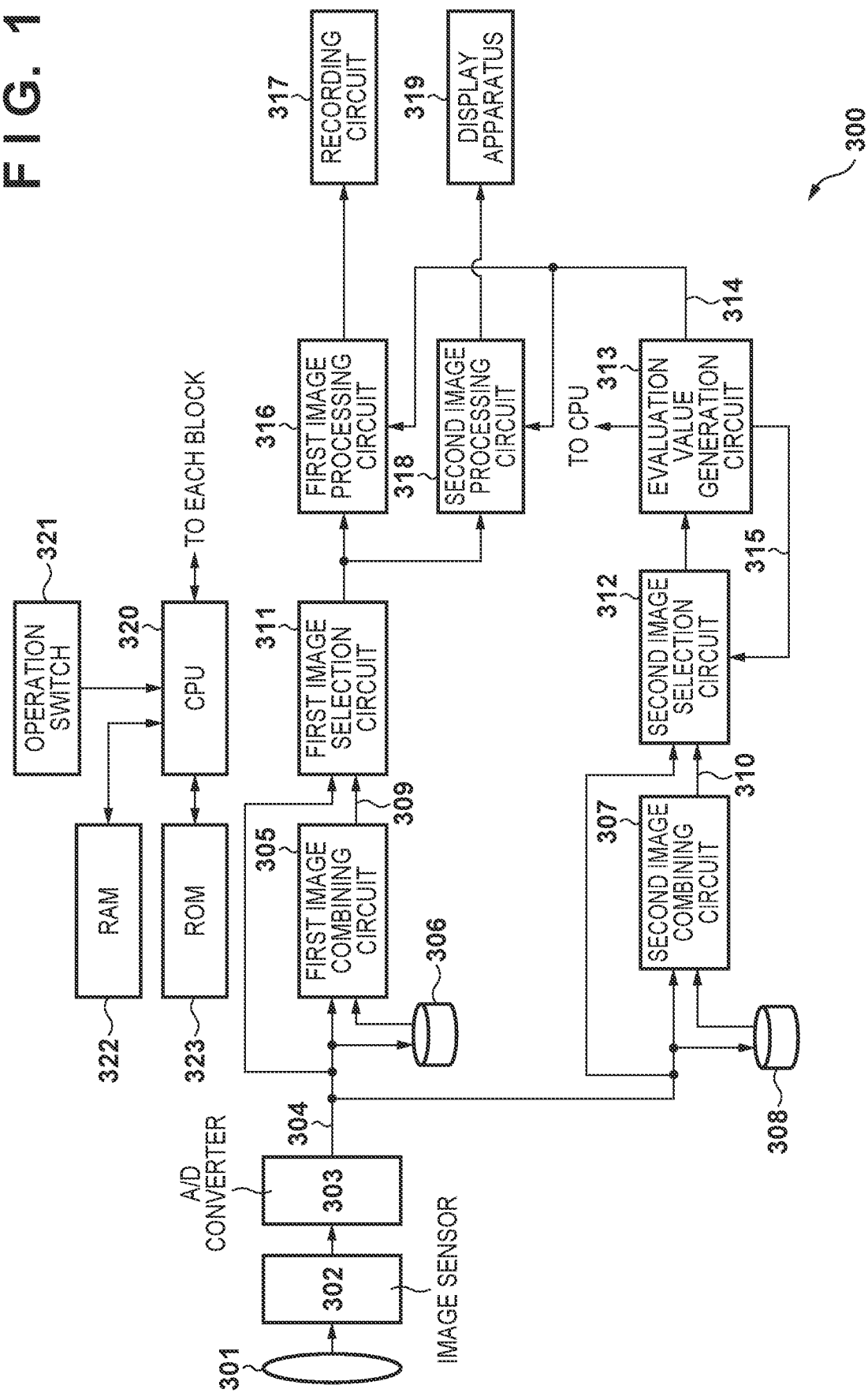
FIG. 1 is a block diagram showing an exemplary function configuration of an image capture apparatus according to a first embodiment.

FIG. 1 is a block diagram showing an exemplary function configuration of an image capture apparatus according to this embodiment.

A lens unit 301 is a shooting optical system, and has an optical lens group that includes a focus lens for adjusting the focal distance, a diaphragm, a motor and actuator for driving the focus lens and the diaphragm, and the like. In this embodiment, the lens unit 301 is fixed to an image capture apparatus 300, but may also be removable. In addition, the diaphragm may also function as a shutter. The lens unit 301 forms an optical image on the image capturing plane of an image sensor 302.

The image sensor 302 has a plurality of pixels arranged in a two dimensional manner. The pixels are provided with respective microlenses and a color filter. The color filter has a configuration in which unit filters of red (R), green (G), and blue (B) are arranged in accordance with a predetermined rule such as the Bayer array. One unit filter is provided in each pixel. Each pixel also has one or more photoelectric conversion portions. The photoelectric conversion portions generate electric charges corresponding to an incident light amount. Therefore, an optical image formed by the lens unit 301 is converted into an electrical signal group by the image sensor 302. An A/D converter 303 converts electrical signals of the respective pixels or photoelectric conversion portions into digital values. Note that the A/D converter 303 may be provided in the image sensor 302.

An operation switch 321 is a general term for an input device group, and is used for the user to input instructions to the image capture apparatus 300. A shutter button, a moving image shooting/stop button, a shooting mode switch dial, direction keys, a determination button, and a menu button are representative examples of input devices included in the operation switch 321. If a display apparatus 319 is a touch display, its touch panel portion is included in the operation switch 321.

A RAM 322 reads programs that are executed by a CPU 320, and stores information required for executing the programs. In addition, the RAM 322 may also be used as a buffer memory to which first and second image processing circuits 316 and 318 temporarily store image data.

A ROM 323 stores programs that can be executed by the CPU 320, various setting values, GUI data, and the like. The ROM 323 may be rewritable.

The CPU 320, which is a control unit, controls the units of the image capture apparatus 300 and realizes the functions of the image capture apparatus 300 by loading programs stored in the ROM 323 to the RAM 322 and executing the programs. Blocks that are not connected to the CPU 320 in drawings are also operated in accordance with control of the CPU 320 in actuality. The CPU 320 executes autofocus (AF) adjustment processing and automatic exposure (AE) control processing based on AF information and AE information acquired from an evaluation value generation circuit 313. For example, the CPU 320 drives the focus lens of the lens unit 301 based on the AF information indicating the defocus amount of the lens unit 301. Also, the CPU 320 determines shooting conditions such as an aperture, a shutter speed, and shooting sensitivity based on the AE information regarding the luminance. Note that the CPU 320 may also execute AF processing of a contrast detection method based on a contrast evaluation value. In addition, when performing detection of a predetermined subject region such as a face region, the evaluation value generation circuit 313 can perform AE processing so as to expose the subject region with a proper exposure, and perform AF processing so as to bring the subject region into focus, based on the detection result of the subject region.

The CPU 320 determines driving methods such as an exposure period and a readout frame rate of the image sensor 302, and controls the operation of the image sensor 302 in accordance with the determined driving methods. Also, when an operation on the operation switch 321, which is a general term for the input device group that includes a key, buttons, and the like, is detected, the CPU 320 executes processing corresponding to the operation. For example, when half-pressing of the shutter button is detected in a still image shooting mode, the CPU 320 recognizes it as a shooting preparation instruction, and executes AF processing and AE processing. Also, when full-pressing of the shutter button is detected, the CPU 320 recognizes it as a shooting start instruction, and executes shooting processing and recording processing of a still image.

Image data 304 that is output by the A/D converter 303 is input to first and second image combining circuits 305 and 307, buffer memories 306 and 308, and first and second image selection circuits 311 and 312.

The buffer memories 306 and 308 store frame image data of the n most recent frames (n is an integer of 1 or greater). The first image combining circuit 305 combines the image data 304 of the current frame and the m most recent frames (m is an integer of 1 or greater, and is smaller than n) stored in the buffer memory 306, and outputs combined image data 309. In other words, the first image combining circuit 305 generates a combined image from (m+1) frames including the current frame. Similarly, the second image combining circuit 307 combines the image data 304 of the current frame and the p most recent frames (p is an integer of 1 or greater, and is smaller than n) stored in the buffer memory 308, and outputs combined image data 310. In other words, the second image combining circuit 307 generates a combined image from (p+1) frames including the current frame.

Note that, in this embodiment, assume that the first image combining circuit 305 erases image data of all of the frames used for the combining processing from the buffer memory 306. Therefore, for example, if m=3, a combined image of the first to fourth frame images, a combined image of the fifth to eighth frame images, . . . are output from the first image combining circuit 305. On the other hand, the second image combining circuit 307 erases, from the buffer memory 308, only the oldest image data out of the image data of the frames used for the combining processing. Therefore, for example, if p=3, a combined image of the first to fourth frame images, a combined image of the second to fifth frame images, . . . are output from the second image combining circuit 307. This is based on an assumption that a frame rate when calculating an evaluation value is the same as the shooting frame rate, and recording and displaying frame rates are lower than the shooting frame rate. Note that the combining method described here is only exemplary, and a combining method that is performed by the first and second image combining circuits 305 and 307 is not limited in particular.

The first image selection circuit 311 selectively outputs one of the image data 304 of the current frame and the combined image data 309 that is output by the first image combining circuit 305, under control of the CPU 320.

The second image selection circuit 312 selectively outputs one of the image data 304 of the current frame and the combined image data 310 that is output by the second image combining circuit 307, under control of the evaluation value generation circuit 313.

The evaluation value generation circuit 313 generates a predetermined evaluation value from image data that is output by the second image selection circuit 312. Here, the evaluation value may be any information acquired from the image data. Examples of the evaluation value include a contrast evaluation value, an evaluation value used for autofocus (AF) processing such as a defocus amount, and an evaluation value used for automatic exposure control (AE) processing such as luminance information (luminance distribution of an entire frame and/or a specific region, a representative luminance value, etc.). In addition, the evaluation value may also be an evaluation value for evaluating the result of detection processing or recognition processing, such as reliability of detection processing of a predetermined subject region such as a face region of a person or animal. In this case, detection processing and/or recognition processing with respect to which an evaluation value is calculated is also executed by the evaluation value generation circuit 313.

In this embodiment, the evaluation value generation circuit 313 generates reliability of detection processing of a subject region (reliability that each detected subject region is a region that includes a predetermined subject), as an evaluation value for controlling the second image selection circuit 312. Specifically, the evaluation value generation circuit 313 generates a control signal 315 for controlling the second image selection circuit 312 so as to output the combined image data 310 if the evaluation value is smaller than a threshold, and to output the image data 304 of the current frame if the evaluation value is larger than or equal to the threshold. Note that a known method can be used for both detection of subject regions and calculation of reliability for each of the detected subject regions, and thus a detailed description thereof is omitted. Here, the reliability (evaluation value) takes a value from 0 to 100, in which 0 is lowest and 100 is highest.

Note that a configuration can be adopted in which, if a plurality of subject regions are detected, a subject region specified by the user, a subject region that is close to the center of the frame, the largest subject region, or the like is determined to be a representative subject region, and reliability for the representative subject region is defined to be a representative evaluation value. Alternatively, reliability that is set as a representative evaluation value may be determined using another method, for example, the average value of reliabilities for a plurality of subject regions is determined to be a representative evaluation value.

In addition, the evaluation value generation circuit 313 supplies, to the first and second image processing circuits 316 and 318, information regarding all of the detected subject regions or a representative subject region (e.g., a position, a size, and reliability).

Furthermore, the evaluation value generation circuit 313 generates AF information and AE information, and supplies them to the CPU 320.

The CPU 320 drives the focus lens of the lens unit 301 based on the AF information, and controls the focal distance of the lens unit 301 so as to be focused on a focus detection region. Note that a configuration may be adopted in which the information regarding a subject region is supplied from the evaluation value generation circuit 313 to the CPU 320 as well, and the CPU 320 determines a focus detection region based on the subject region.

The CPU 320 also determines a shooting condition based on the AE information and a program chart stored in the ROM 323. Then, for example, if the exposure is insufficient at the current frame rate, the CPU 320 determines the number of frames m that are to be combined, such that a combined image that is generated by the first image combining circuit 305 has an appropriate exposure amount, and sets the number of frames m in the first image combining circuit 305. The CPU 320 also controls the first image selection circuit 311 so as to output the combined image data 309 that is output by the first image combining circuit 305. The CPU 320 may also decrease the frame rate of moving image shooting as necessary. Note that, when using a combined image or decreasing the shooting frame rate, the CPU 320 may also cause the first and second image processing circuits 316 and 318 to increase the number of frames as necessary so as to satisfy the recording and/or display frame rate.

On the other hand, if the exposure amount of each frame is not insufficient at the current frame rate, the CPU 320 controls the first image selection circuit 311 so as to output the image data 304 of the current frame.

The first image processing circuit 316 applies predetermined image processing to image data that is output by the first image selection circuit 311, generates image data to be recorded, and outputs the image data to a recording circuit 317. In addition, the second image processing circuit 318 applies predetermined image processing to image data that is output by the first image selection circuit 311, generates image data to be displayed, and outputs the image data to the display apparatus 319.

Image processing that is applied by the first image processing circuit 316 may be processing called development processing such as demosaic (color interpolation) processing or white balance adjustment processing, or processing unique to recording, such as encoding processing or data file generation processing.

Also, image processing that is applied by the second image processing circuit 318 may be processing called development processing such as demosaic (color interpolation) processing or white balance adjustment processing, or processing unique to displaying, such as scaling processing or D/A conversion processing that is based on the display resolution.

Note that a configuration may be adopted in which image processing common with the first and second image processing circuits 316 and 318 is applied by one of those image processing circuits, and image data to which the image processing has been applied is supplied to the other. Also, the first and second image processing circuits 316 and 318 may be realized by one image processing circuit. Each of the first and second image processing circuits 316 and 318 may also be realized by dedicated hardware such as an ASIC, or at least some of the processing may be realized by a micro-processor executing a program.

The recording circuit 317 records data to a recording medium, and reads out data from the recording medium. The recording medium may be a memory card, a magnetic disk drive, or the like. In addition, the recording medium may or may not be removable.

The display apparatus 319 is an LCD or an organic EL display, for example, and is used for displaying an image shot using the image capture apparatus 300, information regarding the image capture apparatus 300, a menu screen, an image regenerated from a recording medium, and the like. During standby for still image shooting or during recording of a moving image, a moving image that is being shot is displayed on the display apparatus 319 substantially in real time, and the display apparatus 319 functions as an electronic view finder.

The image capture apparatus 300 has a configuration of an ordinary digital camera, which is not illustrated for convenience, in addition to the above-described functional blocks.

Next, an operation of the image capture apparatus 300 will be described with reference to the flowchart in FIG. 2. This operation can be executed, for example, when shooting a moving image for live view display during standby for still image shooting, or when shooting a moving image to be recorded. Here, this operation will be described, for example, as processing when a moving image recording button included in the operation switch 321 is operated and shooting of a moving image to be recorded is started. Note that, here, processing related to generation of an evaluation value, out of a series of processing from shooting to recording that is performed for each frame, will be mainly described.

Note that, in this embodiment, the frame rate during shooting of a moving image is set to 120 [frame/second] (fps), and the frame rate during recording is set to 30 fps, for example. Note that these are exemplary, and recording may also be performed at 60 fps or 120 fps.

In step S401, the CPU 320 determines whether or not to use a combined image for recording and displaying, and if it is determined to use a combined image, the procedure advances to step S402, and if it is not determined to use a combined image, the procedure advances to step S403. Determination conditions here are not limited, but the CPU 320 can determine to use a combined image if the shooting frame rate is higher than the recording frame rate, for example. Alternatively, a configuration may also be adopted in which, if the exposure amount of each frame is insufficient at the shooting frame rate, the CPU 320 determines to use a combined image.

In step S402, the CPU 320 determines the number of frames m that are to be read out from the buffer memory 306 and to be combined by the first image combining circuit 305. For example, if the shooting frame rate is 120 fps, and the recording frame rate is 30 fps, the number of frames m to be combined can be determined to be 3. Note that the first image combining circuit 305 combines image data of the current frame and image data of m frames that are read out from the buffer memory 306, and thus a combined image is an image acquired by combining (m+1) frames. Also, the CPU 320 sets the first image selection circuit 311 so as to output the combined image data 309.

In step S403, the CPU 320 sets the number of frames m to 0. Accordingly, the first image combining circuit 305 outputs the image data 304 of the current frame as is. The CPU 320 also sets the first image selection circuit 311 so as to output the image data 304 of the current frame.

Next, in step S404, the CPU 320 determines the number of frames p that are to be read out from the buffer memory 308 and be combined by the second image combining circuit 307. The number of frames p can be a value that is in accordance with the shooting frame rate, for example. The CPU 320 can determine the number of frames p, for example, by referencing the relationship between the shooting frame rate and the number of frames p, which is stored in the ROM in advance. Here, the number of frames p is set to (shooting frame rate/30)−1, as an example. This is a condition for generating a combined image corresponding to 30 fps, which is an ordinary shooting frame rate of a moving image. Note that the number of frames p may be determined based on another condition. The second image combining circuit 307 combines the image data of the current frame and the image data of p frames read out from the buffer memory 308, and thus a combined image is an image acquired by combining (p+1) frames.

In step S405, the CPU 320 causes the evaluation value generation circuit 313 to output the control signal 315 for performing control so as to cause the second image selection circuit 312 to output the image data 304 of the current frame, as initial setting.

In step S406, the CPU 320 causes the image sensor 302 to execute shooting for one frame, and reads out the image signals. The image data 304 of the current frame that has been output from the A/D converter 303 is supplied to the evaluation value generation circuit 313 through the second image selection circuit 312. At this time point, combining processing is not performed by the first image combining circuit 305, and thus recording and displaying are not performed.

In step S407, the evaluation value generation circuit 313 applies subject detection processing to the image data 304 of the current frame. Subsequently, if a subject region is detected, the evaluation value generation circuit 313 obtains subject region information (a position, size, and evaluation value (the reliability of the detection result)) for each subject region, and outputs the obtained information to the first and second image processing circuits 316 and 318. The first and second image processing circuits 316 and 318 apply image processing based on the subject region information 314, and generates image data to be recorded and image data to be displayed. Note that, if a combined image is used for recording and displaying, the first and second image processing circuits 316 and 318 do not operate during a period until a combined image is generated for the first time.

In addition, the evaluation value generation circuit 313 generates AF information and AE information, and outputs the AF information and AE information to the CPU 320. The CPU 320 updates exposure conditions (an aperture and sensitivity) of shooting, and updates the position of the focus lens, based on these evaluation values.

In step S408, the evaluation value generation circuit 313 determines whether or not the image from which the evaluation value has been generated is a combined image, for example, by referencing the value of the control signal 315, and if it is determined that the image is a combined image, the procedure advances to step S411, and if it is not, the procedure advances to step S409.

In step S409, the evaluation value generation circuit 313 determines whether or not the generated evaluation value is smaller than a predetermined threshold, and if it is determined that the evaluation value is smaller than the threshold, the procedure advances to step S410, otherwise the procedure advances to step S411. Note that, as described above, if a plurality of subject regions are detected, the evaluation value generation circuit 313 compares a representative evaluation value with the threshold in step S409. Alternatively, a configuration may also be adopted in which the evaluation value generation circuit 313 compares each of the evaluation values with the threshold, and performs the determination of step S409 based on the ratio or the number of evaluation values that are smaller than the threshold. For example, a configuration is possible in which, if evaluation values that are smaller than the threshold account for half (50%) or more, or there is at least one evaluation value that is smaller than the threshold, the evaluation value generation circuit 313 determines that the reliability is lower than a threshold. Note that these are only exemplary, and the determination of step S409 may also be performed using another method.

In step S410, the evaluation value generation circuit 313 changes the image that is used for generating an evaluation value to a combined image. Specifically, the evaluation value generation circuit 313 outputs the control signal 315 for controlling the second image selection circuit 312 so as to output the combined image data 310. After that, the evaluation value generation circuit 313 advances the procedure to step S411.

If it is determined that the evaluation value is smaller than the threshold, there is a possibility that a decrease in the evaluation value is affected by the moving objects (in particular, small moving objects such as raindrops, water droplets of a fountain, confetti, or flower petals) appearing motionless due to the shooting frame rate being high. Therefore, the evaluation value generation circuit 313 makes a switch so as to generate an evaluation value for a combined image. By using a combined image, it is possible to generate an evaluation value for an image that is similar to an image when the shooting frame rate is decreased in a pseudo manner, and thus it is possible to reduce the influence that the moving object appearing motionless has on the evaluation value.

In step S411, the CPU 320 determines whether or not to end the processing for shooting a moving image to be recorded, and if it is determined to end the processing, the CPU 320 ends the shooting processing and returns to the operation of the standby state. Also, if it is not determined to end the processing for shooting a moving image to be recorded, the CPU 320 returns the procedure to step S406, and executes shooting processing of the next frame.

Figure 2:
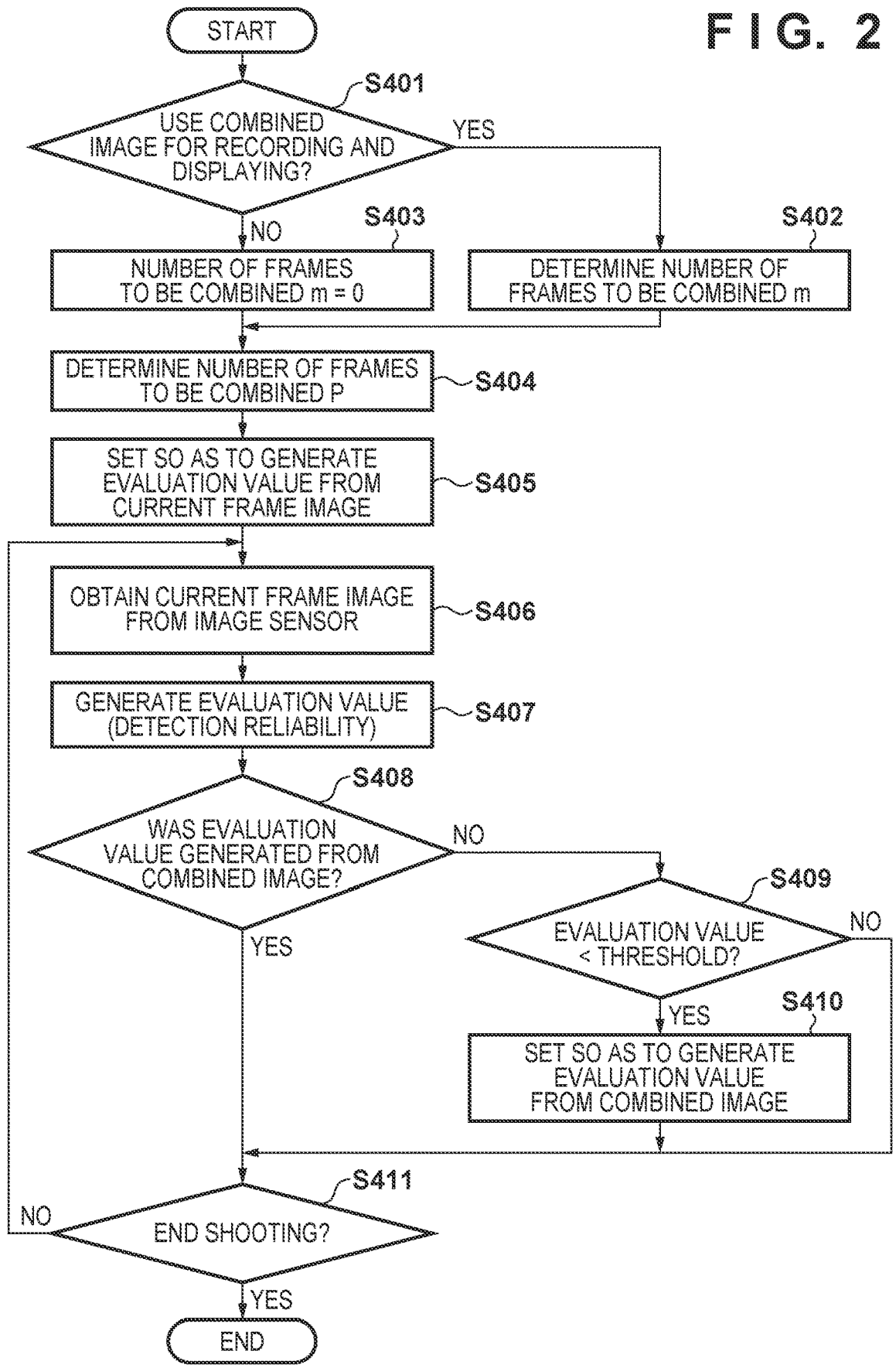
FIG. 2 is a flowchart related to an operation of the image capture apparatus according to the first embodiment.
Figure 3:
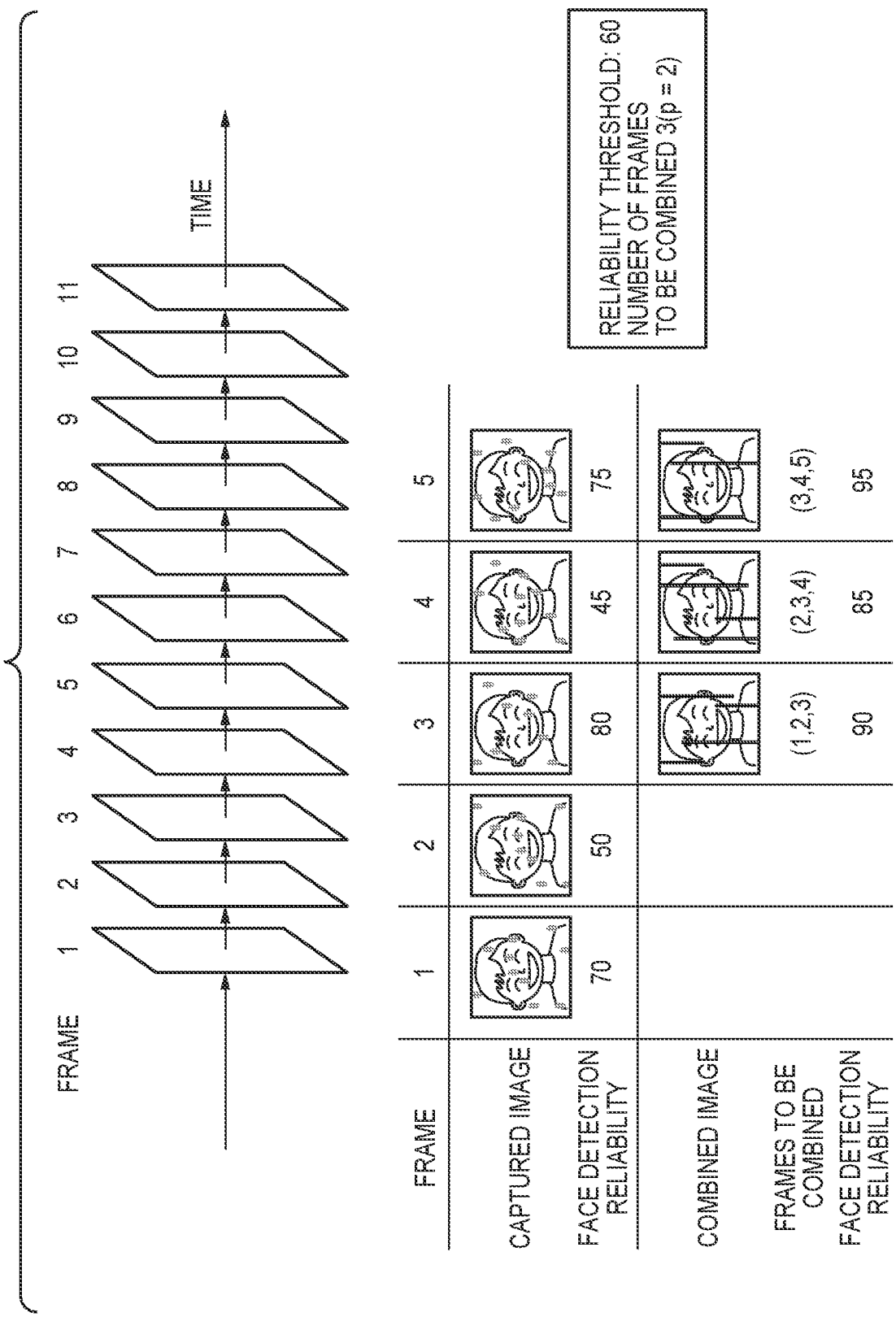
FIG. 3 is a schematic diagram related to an effect of the image capture apparatus according to the first embodiment.

FIG. 3 is a diagram schematically showing an example in which an evaluation value improves through the processing in FIG. 2, in a situation of shooting a person in an environment in which it is raining or there is splash. If an evaluation value is generated for image data acquired by performing shooting at a high frame rate of 120 fps, water droplets appear motionless and clear, and thus the reliability of face region detection processing changes in a large amount depending on a position in a face region at which the water droplets appear, and also values are low over the entirety of the image.

In this regard, for example, assume that, when the reliability reaches 50 for the second frame, which is lower than a threshold (e.g., 60), a switch is made so as to use a combined image. In a combined image, water droplets appear as trajectories, and thus the influence that the image of the water droplets has on processing for detecting a subject region is reduced, a change in the reliability is small, and also values improve over the entirety of the image. Here, a case is described in which three frames are combined to generate a combined image (p=2), but if a larger number of frames are combined, it is possible to reduce the influence that the way a moving object appears (the degree of blur) has on the evaluation value. In addition, a suppression effect on random noise increases. Note that, if the number of frames that are combined is large, it is necessary to consider that the evaluation value is affected by movement of a subject that is to be detected.

As described above, according to this embodiment, when generating an evaluation value from a frame image of a moving image shot at a predetermined frame rate, whether or not a combined image is used as an image from which an evaluation value is generated is determined according to the reliability of the evaluation value. Specifically, if the reliability is smaller than a threshold, an evaluation value is generated from a combined image, and if the reliability is larger than or equal to the threshold, an evaluation value is generated from a frame image that has not been combined. Accordingly, it is possible to lower the influence that a moving object appearing motionless due to the frame rate being high has on the reliability of the evaluation value.

Note that, for a moving image to be recorded and a moving image to be displayed, a recording frame rate and a displaying frame rate may be realized by thinning out frame images, instead of combining frame images. In this case, the first image combining circuit 305, the buffer memory 306, and the first image selection circuit 311 are unnecessary.

Second Embodiment

Next, a second embodiment of the present invention will be described with reference to FIGS. 4 to 6. Note that, in FIGS. 4 and 5, the same reference numerals as FIGS. 1 and 2 are assigned to constituent elements and steps that are similar to those in the first embodiment, and a description thereof is omitted.

This embodiment is different from the first embodiment in that, when generating an evaluation value from a combined image, the number of frame images p to be read out from the buffer memory 308 and combined to generate a combined image is determined dynamically.

Figure 4:
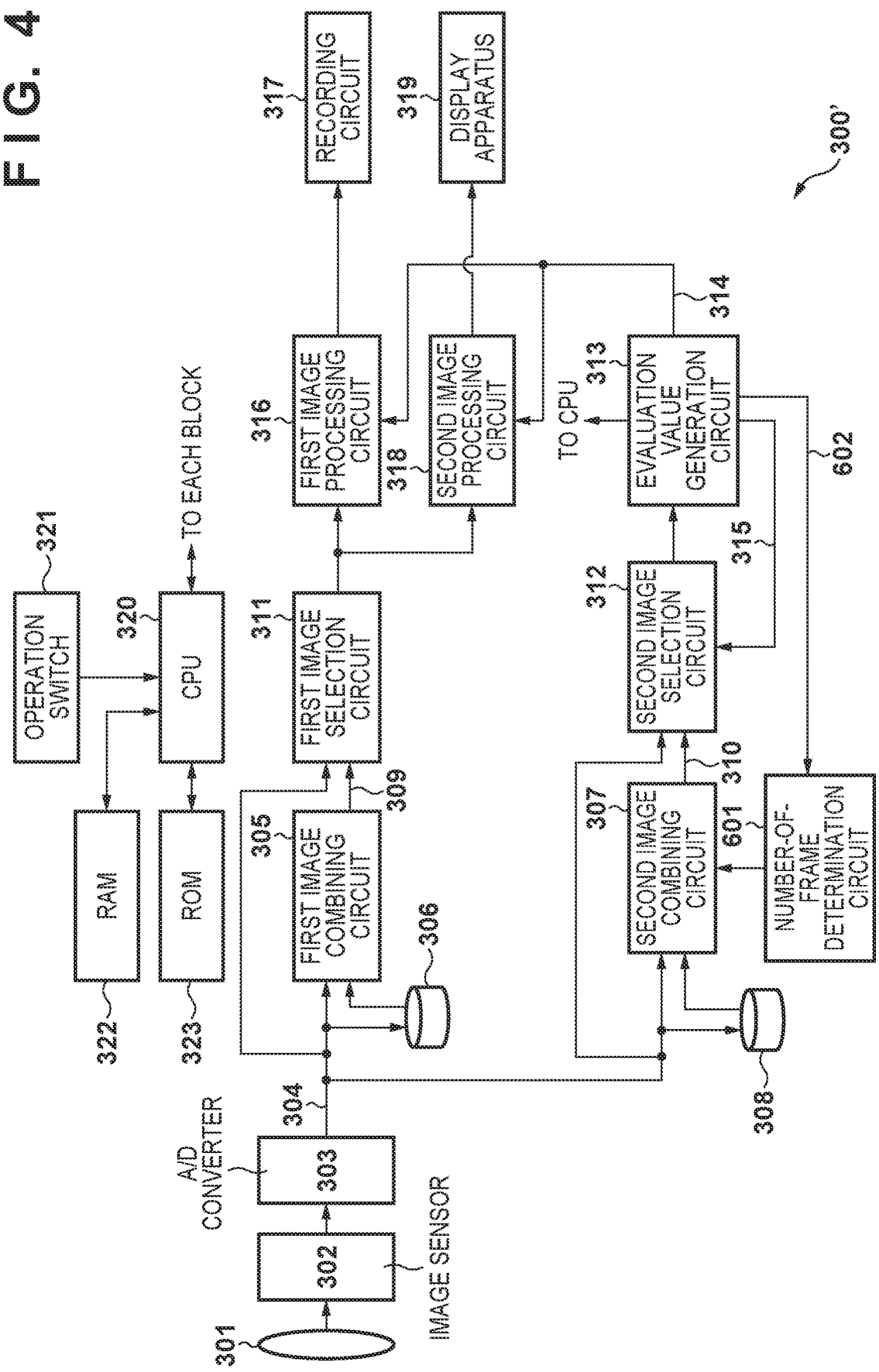
FIG. 4 is a block diagram showing an exemplary function configuration of an image capture apparatus according to a second embodiment.

FIG. 4 is a block diagram showing an exemplary function configuration of an image capture apparatus 300' according to this embodiment. The image capture apparatus 300' is different from the image capture apparatus 300 of the first embodiment in that a number-of-frame determination circuit 601 that dynamically determines the number of frame images p to be combined, based on an evaluation value 602 is provided.

Figure 5:
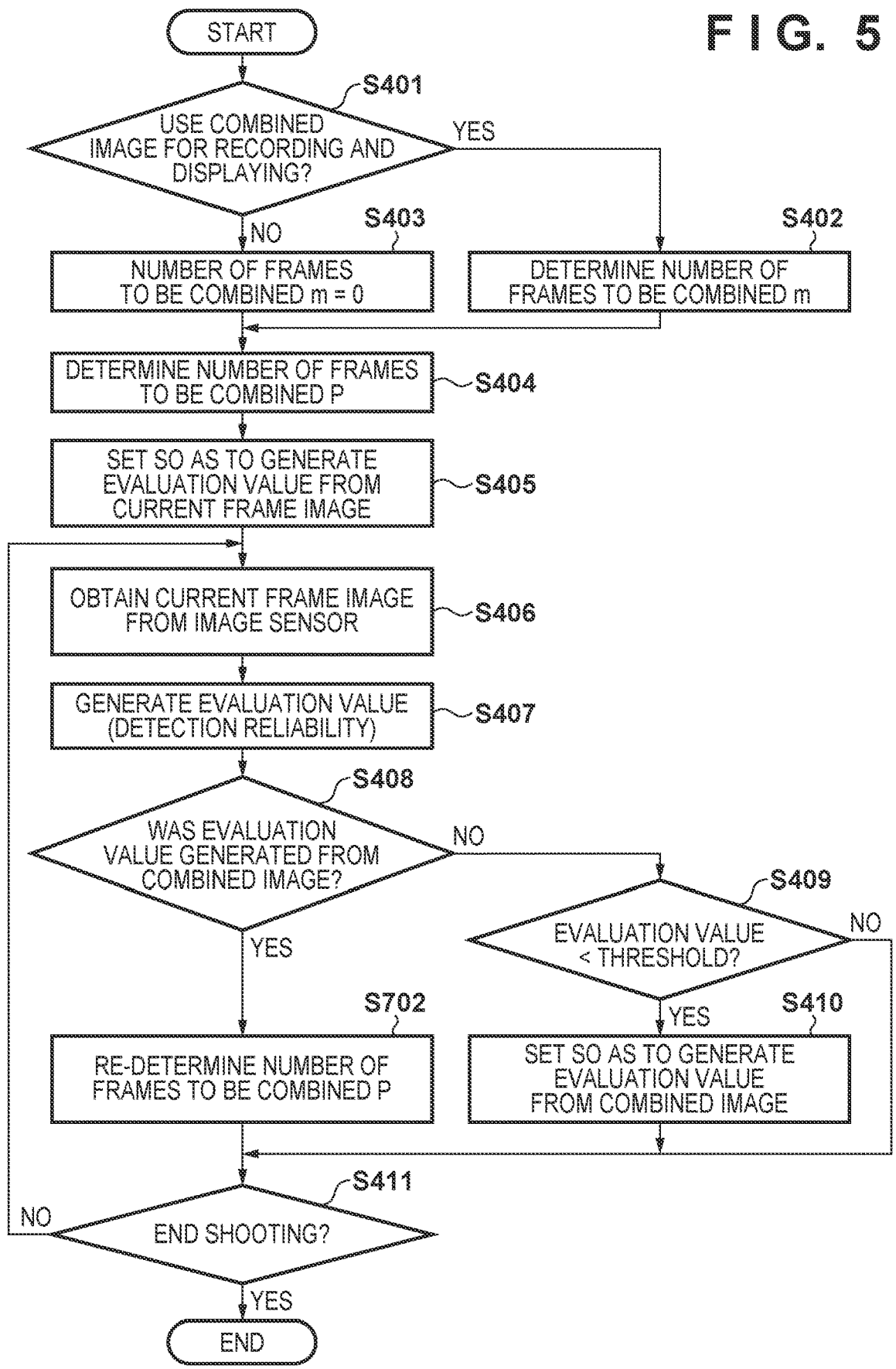
FIG. 5 is a flowchart related to an operation of the image capture apparatus according to the second embodiment.

FIG. 5 is a flowchart related to an operation of the image capture apparatus 300'. This operation can be executed, for example, when shooting a moving image for live view display during standby for still image shooting, or when shooting a moving image to be recorded. Here, this operation will be described, for example, as processing when a moving image recording button included in the operation switch 321 is operated and shooting of a moving image to be recorded is started. Note that, here, processing related to generation of an evaluation value, out of a series of processing from shooting to recording that is performed for each frame, will be mainly described.

Steps S401 to S411 are similar to those in the first embodiment, and thus a description thereof is omitted. Note that, in step S407, the evaluation value generation circuit 313 outputs a generated evaluation value 602 to the number-of-frame determination circuit 601.

If an evaluation value has been generated from a combined image, the procedure advances from step S408 to step S702.

When step S702 is executed for the first time, the number-of-frame determination circuit 601 stores the evaluation value 602 received from the evaluation value generation circuit 313, and increases or decreases the initial value of the number of frames p to be combined determined in step S404, by a predetermined amount. Whether the number of frames p to be combined is increased or decreased during first execution as well as the predetermined amount may be determined in advance.

When step S702 is executed for the second time onward, the number-of-frame determination circuit 601 determines whether or not the evaluation value 602 received from the evaluation value generation circuit 313 exceeds the previously received evaluation value 602. If it is determined that the evaluation value 602 exceeds the previously received evaluation value 602, the number-of-frame determination circuit 601 increases or decreases the number of frames p to be combined, by a predetermined amount in a direction same as before. Also, if it is not determined that the evaluation value 602 exceeds the previously received evaluation value 602, the number-of-frame determination circuit 601 increases or decreases the number of frames p to be combined, by the predetermined amount in a direction opposite to the previous direction. The number-of-frame determination circuit 601 then stores information indicating whether the number of frames to be combined has been increased or decreased, along with the most recent evaluation value 602.

As described above, by dynamically determining the number of frames p to be combined, it is possible to generate a combined image using an optimum number of frames p to be combined, and it is possible to supply an accurate subject detection result to the first and second image processing circuits. In addition, more frame images than necessary are not combined, and thus it is also possible to optimize the load of combining processing.

Figure 6:
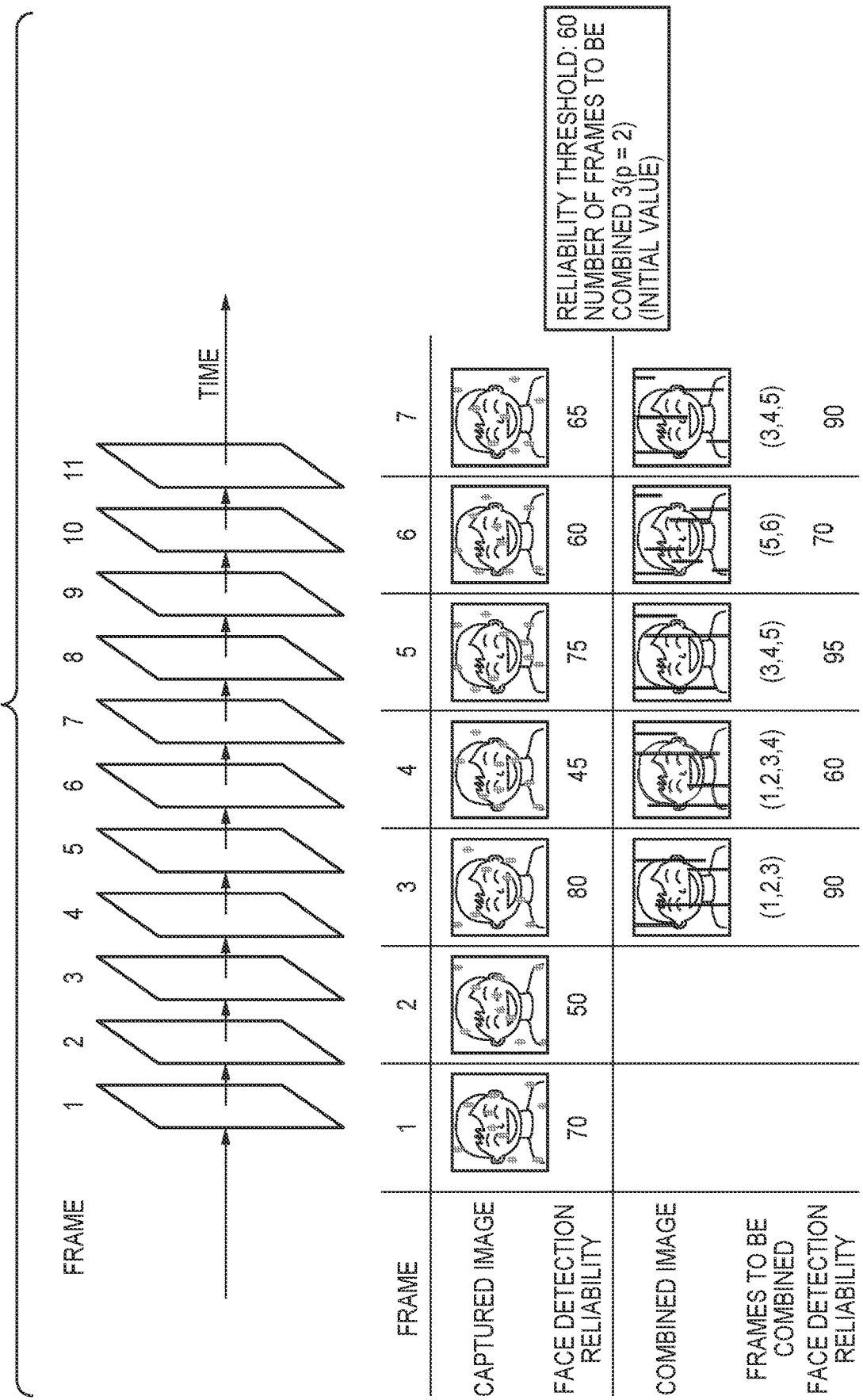
FIG. 6 is a schematic diagram related to an effect of the image capture apparatus according to the second embodiment.

FIG. 6 is a diagram schematically illustrating an effect of this embodiment similarly to FIG. 3 of the first embodiment. Here, the initial value of the number of frames p to be combined is 2, and the processing with respect to first to third frames is the same as that in the first embodiment. When the third frame is shot, and an evaluation value is generated for a combined image for the first time, step S701 is executed. Here, assume that the predetermined amount is 1, and an initial change direction is an increase direction. Therefore, the number-of-frame determination circuit 601 increases the number of frames p to be combined, to 3. Accordingly, when a fourth frame is shot, the second image combining circuit 307 generates a combined image from the first to fourth frame images.

The evaluation value generated from this combined image is 60, and has decreased by increasing the number of frames to be combined. Therefore, the number-of-frame determination circuit 601 decreases the number of frames to be combined, by one. When a fifth frame is shot, the second image combining circuit 307 generates a combined image from the third to fifth frame images. The evaluation value generated from this combined image is 95, and has increased by decreasing the number of frames to be combined. Therefore, the number-of-frame determination circuit 601 decreases the number of frames to be combined, by one.

Therefore, when a sixth frame is shot, the second image combining circuit 307 generates a combined image from the fifth and sixth frame images. The evaluation value generated from this combined image is 70, and has decreased as a result of reducing the number of frames to be combined. Therefore, the number-of-frame determination circuit 601 increases the number of frames to be combined, by 1. From this time on, the number-of-frame determination circuit 601 updates the number of frames p to be combined similarly.

As described above, the number of frame images for generating a combined image that is used for generating an evaluation value is determined dynamically in accordance with a change in the evaluation value. According to this embodiment, in addition to an effect similar to that of the first embodiment, it is possible to optimize the number of frame images to be combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-138011, filed on Jul. 23, 2018, which is hereby incorporated by reference herein in its entirety.

What is claimed is:

1. An image processing apparatus comprising:
one or more processors that execute a program and, when executing the program, operate as:
a combining unit configured to generate a combined image by combining a plurality of frame images of a moving image that include a current frame image;
a selecting unit configured to selectively output the current frame image or the combined image; and
a generating unit configured to generate a predetermined evaluation value from the image that is output by the selecting unit,
wherein the generating unit controls the selecting unit to output the combined image if the evaluation value generated from the current frame image is smaller than a threshold, and
wherein a shooting frame rate of the moving image is higher than a recording or displaying frame rate of the moving image.

2. The image processing apparatus according to claim 1, wherein the evaluation value is a value indicating a reliability of information acquired from the image that is output by the selecting unit.

3. The image processing apparatus according to claim 1, wherein the generating unit performs subject detection processing on the image that is output by the selecting unit, and
the evaluation value is a value indicating a reliability of a detected subject region.

4. The image processing apparatus according to claim 3, wherein the one or more processors, when executing the program, further operate as:
an image processing unit configured to generate image data to be displayed or recorded from a frame image of the moving image, using information regarding the subject region detected by the generating unit.

5. The image processing apparatus according to claim 1, wherein the one or more processors, when executing the program, further operate as:
a determination unit configured to determine the number of frames to be combined by the combining unit, based on the evaluation value.

6. The image processing apparatus according to claim 5, wherein, if the evaluation value increases when the number is increased or decreased, the determination unit changes the number in the same direction, and if the evaluation value decreases when the number is increased or decreased, changes the number in the opposite direction.

7. The image processing apparatus according to claim 1, wherein:
in a case where the selecting unit outputs the combined image, if the evaluation value generated by the generating unit increases as a result of increasing the number of the plurality of frame images that the combining unit combines to generate the combined image, the combining unit further increases the number of the plurality of frame images.

8. The image processing apparatus according to claim 1, wherein:
in a case where the selecting unit outputs the combined image, if the evaluation value generated by the generating unit increases as a result of decreasing the number of the plurality of frame images that the combining unit combines to generate the combined image, the combining unit further decreases the number of the plurality of frame images.

9. An image capture apparatus comprising:
an image sensor for shooting a moving image; and
an image processing apparatus that processes a moving image shot using the image sensor, wherein the image processing apparatus comprises:
one or more processors that execute a program and, when executing the program, operate as:
a combining unit configured to generate a combined image by combining a plurality of frame images of a moving image that include a current frame image;
a selecting unit configured to selectively output the current frame image or the combined image; and
a generating unit configured to generate a predetermined evaluation value from the image that is output by the selecting unit,
wherein the generating unit controls the selecting unit to output the combined image if the evaluation value generated from the current frame image is smaller than a threshold, and
wherein a shooting frame rate of the moving image is higher than a recording or displaying frame rate of the moving image.

10. An image processing method that is executed by an image processing apparatus, comprising:
generating a combined image by combining a plurality of frame images of a moving image that include a current frame image;
outputting the current frame image or the combined image selectively; and
generating a predetermined evaluation value from the image that is outputted by the outputting,
wherein, the generating controls the outputting to output the combined image if the evaluation value generated from the current frame image is smaller than a threshold, and
wherein a shooting frame rate of the moving image is higher than a recording or displaying frame rate of the moving image.

11. A non-transitory computer-readable medium that stores a program for causing a computer to function as an image processing apparatus comprising:
a combining unit configured to generate a combined image by combining a plurality of frame images of a moving image that include a current frame image;
a selecting unit configured to selectively output the current frame image or the combined image; and
a generating unit configured to generate a predetermined evaluation value from the image that is output by the selecting unit,
wherein the generating unit controls the selecting unit to output the combined image if the evaluation value generated from the current frame image is smaller than a threshold, and
wherein a shooting frame rate of the moving image is higher than a recording or displaying frame rate of the moving image.

12. An image processing apparatus comprising:
one or more processors that execute a program and, when executing the program, operate as:
a combining unit configured to generate a combined image by combining a plurality of frame images of a moving image; and
a generating unit configured to generate a predetermined evaluation value from the combined image that is output by the combining unit,
wherein, if the evaluation value generated by the generating unit increases as a result of increasing the number of the plurality of frame images that the combining unit combines to generate the combined image, the combining unit further increases the number of the plurality of frame images.

13. The image processing apparatus according to claim 12, wherein, if the evaluation value generated by the generating unit increases as a result of decreasing the number of the plurality of frame images that the combining unit combines to generate the combined image, the combining unit further decreases the number of the plurality of frame images.

14. An image capture apparatus comprising:
an image sensor for shooting a moving image; and
an image processing apparatus that processes a moving image shot using the image sensor, wherein the image processing apparatus comprises:
one or more processors that execute a program and, when executing the program, operate as:

a combining unit configured to generate a combined image by combining a plurality of frame images of a moving image; and a generating unit configured to generate a predetermined evaluation value from the combined image that is output by the combining unit, wherein, if the evaluation value generated by the generating unit increases as a result of increasing the number of the plurality of frame images that the combining unit combines to generate the combined image, the combining unit further increases the number of the plurality of frame images.

15. An image processing method that is executed by an image processing apparatus comprising:

generating a combined image by combining a plurality of frame images of a moving image; and generating a predetermined evaluation value from the combined image that is output by the combining unit, wherein, if the evaluation value generated in the generating increases as a result of increasing the number of the plurality of frame images that the combining combines to generate the combined image, the number of the plurality of frame images is further increased.

16. A non-transitory computer-readable medium that stores a program for causing a computer to function as an image processing apparatus comprising:

a combining unit configured to generate a combined image by combining a plurality of frame images of a moving image; and a generating unit configured to generate a predetermined evaluation value from the combined image that is output by the combining unit, wherein, if the evaluation value generated by the generating unit increases as a result of increasing the number of the plurality of frame images that the combining unit combines to generate the combined image, the combining unit further increases the number of the plurality of frame images.

\* \* \* \* \*